US008657606B2

(12) United States Patent
Fisher (10) Patent No.: US 8,657,606 B2
(45) Date of Patent: Feb. 25, 2014

(54) ASYNCHRONOUS ART JURYING SYSTEM

(76) Inventor: Paul Fisher, West Palm Beach, FL (US)

( * ) Notice: Subject to any disclaimer, the term of this patent is extended or adjusted under 35 U.S.C. 154(b) by 773 days.

(21) Appl. No.: 11/174,840

(22) Filed: Jul. 5, 2005

(65) Prior Publication Data

US 2006/0003302 A1    Jan. 5, 2006

Related U.S. Application Data (60) Provisional application No. 60/521,788, filed on Jul. 2, 2004.

(51) Int. Cl.
*G09B 9/00* (2006.01)
*G09B 19/00* (2006.01)

(52) U.S. Cl.
USPC ........... 434/306; 345/619; 345/620; 345/625; 348/231.2; 348/231.99; 358/1.18; 358/448; 358/450; 358/452; 358/453; 434/350

(58) Field of Classification Search
USPC ......... 434/306, 350; 358/1.18, 448, 450, 452, 358/453; 345/619, 620, 625; 348/231.2, 348/231.99
See application file for complete search history.

(56) References Cited

U.S. PATENT DOCUMENTS

| | | | |
|---|---|---|---|
| 5,970,471 A * | 10/1999 | Hill | 705/26 |
| 5,987,302 A * | 11/1999 | Driscoll et al. | 434/353 |
| 6,028,603 A * | 2/2000 | Wang et al. | 715/776 |
| 6,301,586 B1 * | 10/2001 | Yang et al. | 707/104.1 |
| 6,456,305 B1 * | 9/2002 | Qureshi et al. | 715/800 |
| 6,850,247 B1 * | 2/2005 | Reid et al. | 345/611 |
| 6,904,168 B1 * | 6/2005 | Steinberg et al. | 382/165 |
| 6,957,398 B1 * | 10/2005 | Nayeri | 715/867 |
| 2002/0035481 A1 * | 3/2002 | Neulight | 705/1 |
| 2002/0122067 A1 * | 9/2002 | Geigel et al. | 345/788 |
| 2002/0135621 A1 * | 9/2002 | Angiulo et al. | 345/838 |
| 2002/0169773 A1 * | 11/2002 | Penrod et al. | 707/6 |
| 2002/0198050 A1 * | 12/2002 | Patchen | 463/40 |
| 2003/0007078 A1 * | 1/2003 | Feldis, III | 348/231.6 |
| 2003/0074373 A1 * | 4/2003 | Kaburagi et al. | 707/104.1 |
| 2003/0101237 A1 * | 5/2003 | Ban et al. | 709/218 |
| 2003/0105642 A1 * | 6/2003 | Andino et al. | 705/1 |
| 2003/0115265 A1 * | 6/2003 | Kitade et al. | 709/203 |
| 2003/0128389 A1 * | 7/2003 | Matraszek et al. | 358/1.18 |
| 2003/0149616 A1 * | 8/2003 | Travaille | 705/12 |
| 2003/0177493 A1 * | 9/2003 | Hirose | 725/41 |
| 2003/0234953 A1 * | 12/2003 | Dawson et al. | 358/1.15 |

(Continued)

*Primary Examiner* — Jack Yip
(74) *Attorney, Agent, or Firm* — Duane Morris LLP; J. Rodman Steele, Jr.; Gregory M. Lefkowitz (57) ABSTRACT

A remote art jurying system in which art jurors independently evaluate works of art at different locations, times and places. A central database presents information about each work of art and/or the artist to an individual juror. The database provides images of the artwork along with relevant information. Each juror can access the database independent of other jurors in terms of location, or time. The system provides enhanced voting methods. The juror can review or change their votes at any time prior to final submission. They can review all works of art, by categories of art, or by scores. The juror reviews artwork thumbnail images, which can be used to select high resolution images with extended information. Selected categories of art can be enhanced by eliminating the lowest scores to balance artwork finalists across multiple categories of art. An online artist's application system is integrated with an image portfolio management system which allows artists to maintain permanent portfolio copies which can be electronically attached to applications. The system can be used for jurying art or other types of competitive ratings.

22 Claims, 4 Drawing Sheets

(56) References Cited

U.S. PATENT DOCUMENTS

| | | | |
|---|---|---|---|
| 2003/0236831 A1* | 12/2003 | Ortiz et al. | 709/204 |
| 2003/0236832 A1* | 12/2003 | McIntyre et al. | 709/204 |
| 2004/0172440 A1* | 9/2004 | Nakajima et al. | 709/200 |
| 2004/0250205 A1* | 12/2004 | Conning | 715/517 |
| 2005/0071122 A1* | 3/2005 | Deeds | 702/179 |
| 2005/0138560 A1* | 6/2005 | Lee et al. | 715/719 |
| 2005/0144633 A1* | 6/2005 | Babayan | 725/24 |
| 2005/0192924 A1* | 9/2005 | Drucker et al. | 707/1 |
| 2005/0240865 A1* | 10/2005 | Atkins et al. | 715/517 |
| 2005/0243381 A1* | 11/2005 | Hill et al. | 358/453 |

\* cited by examiner

| Order Viewed | Name | Vote | Images | Review |
|---|---|---|---|---|
| 1 | Logan | ○○○○○○● 1 2 3 4 5 6 7 | | View App |
| 2 | Brian | ○○○●○○○ 1 2 3 4 5 6 7 | | View App |
| 3 | Charmaine | ○○○○●○○ 1 2 3 4 5 6 7 | | View App |
| 4 | Dawn | ○○○○●○○ 1 2 3 4 5 6 7 | | View App |
| 5 | Jennifer | ○○○○●○○ 1 2 3 4 5 6 7 | | View App |
| 6 | Michael | ○○○○○●○ 1 2 3 4 5 6 7 | | View App |

Reviewing your votes 1 to 6 of 75 in Basketry ns as good as it could be. This is because a highly knowledgeable juror may have other commitments that would prevent attendance at the viewing. Due to the inconvenience of having to be present at a specific time and place, many highly sought after jurors may not be available. It would be desirable to have a system which allows jurors to independently evaluate artworks without having to be in the presence of the other jurors. Likewise, it would also be desirable to have an art jurying system which would allow jurors to evaluate particular works of art at different points in time. This would free prospective jurors from scheduling conflicts that would otherwise prevent their participation.

ASYNCHRONOUS ART JURYING SYSTEM

CROSS-REFERENCE TO RELATED APPLICATIONS

This application is related to, and claims the benefit of, the provisional patent application entitled "Asynchronous Art Jurying System," filed Jul. 2, 2004, bearing U.S. Ser. No. 60/521,788 and naming Paul Fisher, the named inventor herein, as sole inventor, the contents of which is specifically incorporated by reference herein in its entirety.

BACKGROUND OF INVENTION

1. Technical Field

The present invention relates to evaluation systems. In particular, it relates to an asynchronous art jurying system which allows jurors to independently evaluate artworks from different locations, at different points in time, and at different speeds. It provides artists with the ability to enter applications online and store one or more of their portfolios electronically with the ability to independently update each of their portfolios.

2. Background

A common event in the art world is the art show where numerous artists of one or more disciplines come together for public displays of their work. One competitive aspect of these shows has been the evaluation of the artworks and the awarding of recognition to artists whose works have been deemed the best, or one of the best, of the art works in their discipline at the show.

In a juried art show, a set of jurors is selected based on their knowledge and expertise in one or more fields of art. These jurors evaluate the artworks firsthand and make a judgment as to the relative merits of an individual item of artwork. The results of their judgments are accumulated with scores for each artist or item of artwork. The total scores provided by the jurors are counted manually to determine the ranking of the various artists for the given show. Unfortunately, a manual tabulation results in substantial time delays to compile the scores. Further, a manual tabulation also increases the possibility of human error in the scoring process. It would be desirable to have a system which would eliminate errors injected by manual tabulation systems, and further eliminate the substantial time delays created by the prior art manual tabulation method.

The larger and more elaborate an art show is, the more unwieldy and inconvenient the process of directly evaluating the individual artworks becomes. The prior art attempted to address this problem by developing a system of jurying which allowed the jurors to convene at a predetermined location to evaluate artworks without requiring the jurors to physically examine the individual works of art firsthand. In particular, jurors would assemble as an audience and view a slide show or image review which presents a collection of images for each artist along with a presentation describing the artwork and the artist.

This process, while improving over the previous method of evaluation, has several disadvantages. In particular, this jurying method required that all of the jurors be present at the same location, and at the same time, for viewing the slide show or Image Review. Not only does this method inconvenience the jurors who do participate, but it also creates the situation where the jury pool may not be as good as it could be. This is because a highly knowledgeable juror may have other commitments that would prevent attendance at the viewing. Due to the inconvenience of having to be present at Another significant problem associated with prior art jurying systems is that the optimal amount of time to evaluate a particular work of art varies from juror to juror. The prior art slide shows or image reviews present the artwork to all the jurors at the same time, which results in some jurors having too much time to evaluate an artwork and other jurors not having enough time. On occasion, jurors may raise questions that would require a slide to be redisplayed. This will further assist jurors who do not desire to see a slide redisplayed. It would be desirable to have a method of allowing each juror to take whatever amount of time that juror felt was necessary to properly evaluate a work of art, without delaying or hurrying the other jurors, and to free each juror from having to review an item of artwork unless they specifically request it.

Another undesirable aspect of current art jurying systems is that there is a substantial effort required of artists to participate in a juried art show. An artist must go through an elaborate manual process to enter an art show. First, the artist must prepare a substantial physical portfolio depicting the artist's work. The physical portfolio must then be submitted along with the application prior to the art show. Preparation of an art portfolio typically involves substantial cost because of the photography, packaging, and shipping charges. In addition, there is also the danger of loss in transit, or damage to the portfolio in shipping. Another problem associated with the filing of art portfolios is that portfolios may vary from one show to another. As a result, an artist may have to construct a new portfolio for every art show that is entered. In addition to the initial portfolio submission, when artists determine that they need to update their portfolio for given art show, they must go through the same process. Artists are further inconvenienced because they must go through this process every time they enter a juried art show. Of course, this requires that the artist continuously create portfolios at substantial cost and inconvenience. It would be desirable to have a system in which artists could more easily construct or modify portfolios and submit them to a juried art competition.

Another inconvenience to artists is that, in addition to submission of the portfolio, the application process is also a manual process in which the artist has the risk of loss or delay and the inability to make any changes to the application. It would be desirable to have a system which provides artists with the ability to rapidly and conveniently enter applications and relate those applications to a particular portfolio.

SUMMARY OF THE INVENTION

The present invention provides an asynchronous art jurying system in which jurors at one or more locations can independently evaluate various items of art. Each juror uses a terminal or remote computer to review information about each work of art which is contained in a central database. The user displays images of the artwork along with relevant information describing the work and/or the artist. Each juror has independent access to the database which allows the juror's evaluation to be self-paced. Each juror's terminal can be remote or local to the art show, which allows the juror pool to be worldwide. Each local or remote terminal or computer integrates voting and viewing to allow jurors to vote when they finish their analysis, or at another time of their choosing. Each individual juror has the ability to set their own time schedule to independently review individual items of art. The system provides several methods of enhancing the voting process. The jurors can review or change their votes at any time. They can review all works of art, they can review categories of art, or they can review artworks based on score ranges. In the review process, they have the ability to arrange the review page from highest score to lowest or visa versa. In the review process, the juror selects artists from a menu which uses thumbnail images of individual works of art. When selected, high resolution images with extended information are presented. To account for discrepancies in scoring between different categories of art, the system can filter finalists by categories of art to balance artwork finalists across multiple categories of art. The system also provides an improved method of portfolio submission and application management. The system allows an artist to file applications online, for one or more art shows, in a central database. In addition, the artist can prepare one or more electronic portfolios containing selected images in a select order of presentation and store them in a central online database. The portfolios submitted to the central database can be referred to by the applications, thereby eliminating the need to file a new portfolio with each application. Artists have the ability to modify or delete existing portfolios, or create new portfolios, at any time.

BRIEF DESCRIPTION OF THE DRAWINGS

FIG. 1 illustrates the main menu after juror log on.

DETAILED DESCRIPTION OF THE PREFERRED EMBODIMENT

Prior to a detailed discussion of the figures, a general overview of the asynchronous art jurying system will be presented. This invention provides art jurors with the ability to participate in art shows around the world without having to travel to them. As a result, art shows can be judged by jurors having higher levels of expertise than may be available locally. The system also improves the ability of each juror to give the best possible evaluation by relieving them of the hampering effects for art jurying when prior art methods are used. For example, because prior art jurying systems require jurors evaluating artwork to be in a single setting, the jurors were not able to individually pace themselves at a speed which is comfortable for them. As a result, some jurors did not have enough time to properly evaluate work of art, while other jurors waste time because they evaluate artworks faster and have an excessive amount of waiting time between artworks. Further, some jurors who may wish to seek more information regarding a particular work are reluctant to do so because they do not want to slow down or annoy others within the jury pool.

The invention makes it possible for each juror to independently evaluate the artwork. Through the use of remote jurying, the juror can evaluate the artwork in a location which as is comfortable and convenient for that particular juror. This asynchronous system allows the juror to take as much time as the juror feels necessary when evaluating each individual work of art. Further, the system can also provide a juror with the ability to obtain additional information which might not readily be available in a prior art slide show or image review presentation. The system provides the juror the ability to obtain background information describing techniques used by the artist when creating the work of art. The capability to obtain additional information is very important, because in many fields of art, techniques which are substantially different can produce artworks which are very similar. Having online information available concerning the techniques used by the artist can be very important to properly evaluate the quality of a particular item of art. This self pacing and information rich aspect of the invention helps each juror provide the best evaluation they are capable of.

The system also uses integrated voting which is combined with the voting function of the system. This eliminates the administrative overhead associated with other conventional jurying systems. It also improves the accuracy of the system because errors made by manual prior art systems are eliminated. Further, the system provides the ability of the juror to reconsider previous votes and change them at will. In particular, the juror has the ability to review sections of the art show at any time and change their evaluations at any time prior to submission. By so doing, a more accurate evaluation can be made by allowing the juror to reconsider their initial vote. The system allows the user to organize items of art into categories (e.g., paintings, sculpture, pottery, etc.) so that items of art can be evaluated in comparison to similar artworks. The integrated voting system also allows the juror to dynamically modify votes across categories. Because scoring may vary based on the category of art, this technique may be used to ensure that at least some of the best works from each category are represented in an art show. Scoring may vary from one type of art to another. Likewise, scoring may vary from one or show to another. To accommodate this, different scoring ranges (e.g., 1-7, 1-10, 1-100, etc.) maybe used.

The system also provides online and telephone technical support to assist individual jurors when they have technical questions concerning operation of the system. This provides the sophisticated art juror, may not the familiar with technical aspects of computers, to receive technical support when and where needed.

As discussed above, the prior art slide show or image review systems which are used to judge artwork require each juror to arrive at a pre-selected location, and to review each item of artwork in a fixed time window determined by the presenter. In addition, the prior art systems require extensive preparation of portfolios by the artist which greatly increase the inconvenience and expense of the artist, and which greatly increase the chance of errors in the application process, or damage to the portfolio during application process. The asynchronous art jurying system provided herein allows an artist to create one or more digital portfolios which are submitted to a central database where they may be permanently stored until deleted by the artist. The artist can configure a variety of portfolios depending on the type of art which is intended to be submitted to a given art show. During the application process, instead of providing a physical portfolio, as is done on the prior art, the artist needs only to refer to a particular portfolio in the application. The artist has an additional advantage in that each portfolio can be modified as needed by the artist. His online central administration of portfolios greatly increases the efficiency and convenience of the application process for the artist, and decreases the substantial expense associated with the prior art practice of submission of physical portfolios.

Having discussed the asynchronous art jurying system in general, we turn now to a more detailed discussion of the invention. The art jurying system provided by the invention provides several improvements over the prior art. A brief description of some of these features follows:

Detailed Jurying System Feature Overview

1. Portfolio Feature.

Artists typically provide a portfolio of sample artworks for use in art shows. In the past, an artist had to prepare and submit a portfolio for every art show they competed in. This required a substantial amount of expense and effort by the artist. High quality samples had to be prepared for each show, typically in the form of photographs or slides. The artist then had to submit the portfolio as part of the application process. In addition to the expense associated with preparing the application portfolio, the artist also had to be concerned that the portfolio safely arrived in good condition, or arrived at all.

The portfolio feature of the invention allows artists to submit their applications electronically to a central database. The artist controls which items of artwork are held in the database. In addition, the artist may have multiple portfolios in the central database which would be selected based on the nature of a particular art show. This greatly simplifies the application process for the artist, because almost all of the time and expense associated with preparing a portfolio for an art show application is eliminated. Further, an artist using the present invention does not have to be concerned about the sample portfolios safely arriving with the application.

The central database can be accessed by art shows located anywhere so long as they have authorization to access the database. This provides a significant advantage to the artist since they can store images in a single portfolio, or in multiple portfolios in a central database, and only update them as needed. The artist only has to select the portfolio he or she wants to use for a particular application. In addition, portfolios relating to prior applications may also be stored. This is a substantial improvement over the prior art because it eliminates the need for an artist to provide separate copies of the artist's portfolio at every art show. The system also allows the artist to dynamically modify the portfolio which is maintained in the central database prior to the application deadline. In the prior art, portfolios were sent to different art shows with a primitive method, such as photographs or photographic slides sent through the mail. Using the cumbersome methods of the past, changes to portfolios were difficult to make, or not allowed at all. This system allows the original portfolio submission, as well as updates to the portfolio, in the form of digital images, whose safe submission can be immediately verified.

2. Slide Show or Image Review Feature.

Jurors can use a computerized slide show or image review feature during voting whenever they wish. As opposed to current slide shows which use the fixed format that is demanded by slide presentation technology, the invention allows the juror to determine how the slide show or image review will be presented. For example, the juror can instruct the system to present the artists images randomly, it can present them in sequence, it can present them by category, it can present them in forward or reverse order, and it can present them at time intervals selected by the juror. Further, the juror can construct the system to display images in an automatic mode, or it can allow the juror to manually select when images are displayed. Since each juror has this capability, every juror can display the items in the competition in the sequence and manner which is most comfortable for that particular juror.

Jurors also have the ability to use more advanced features of the invention. For example, the system provides a pop-up menu which the juror can use to select a particular artist by number and a search feature to allow the juror to select an artist by name. Further, multiple jurors can use this feature to enhance discussions about artists or various items of art.

3. Review Feature.

This feature allows jurors to see the thumbnail images of all the work they have voted for in a category and can review their initial votes while doing so. By viewing images simultaneously, jurors may change their minds as to votes which have been tentatively cast but not finalized. While in review mode, jurors can change their votes before submitting their final votes. By providing jurors with the ability to review all the votes in a category before submitting them, jurors can correct errors or change their opinion prior to submitting a final vote, which will result in a more accurate evaluation. The system provides flexibility for the juror to rearrange the items in the manner in which the votes were cast. For example, they can arrange the display of items by ranking (e.g., ascending or descending), by artist, by art category, etc. The juror can then refresh the display to show the items of art in the adjusted voting order. This can be repeated until the juror is satisfied that the votes are in the order the juror wants them.

4. Enlarged Images.

This feature automatically moves data associated with a particular image to the side or the bottom of the screen, depending on whether the image is oriented vertically or horizontally, when the image is enlarged. This eliminates the need for the jurors to scroll back-and-forth to read the description of an artwork when its image is enlarged and displayed. The automatic movement of data to side of the screen increases the convenience of the juror because it provides the largest possible image while eliminating the need to scroll to read the data.

5. Input Choices.

Jurors have their own individual tastes and preferences when it comes to the use of computer systems. When controlling the system or entering data, the juror can use a number of methods to jury an art show. For example, the juror can use traditional I/O devices such as a mouse, a keyboard, or a combination of both according to personal taste and comfort. In addition, the juror can also take advantage of newer technologies such as voice recognition to control the jury system. The invention is intended to provide the maximum amount of flexibility to the juror in terms of system control.

6. Data Capture.

Data related to juror activity is automatically captured and recorded to identify usability problems and potential system improvements. For example, data can reveal the timing of each vote, the frequency of review, the juror's average vote overall, average vote score per category, the number of enlarged images each juror reviewed for each vote, how far jurors diverged in their voting, how many rounds were required to reach the final winner's list, and how many applications were viewed in each voting round, etc.

7. The Portfolio Management System

The asynchronous portfolio management system is a central database in which artists create and store one or more portfolios for use at art shows. The artists retain the ability to modify or delete portfolios as they desire. As noted above, the submission of the portfolio historically has been done by cumbersome and expensive methods such as sending photographs or slides through the mail. A significant advantage provided by the portfolio management system is that an artist only needs to create a portfolio once. Once the portfolio is created, it is stored in a central database where it is available for distribution to any number of art shows electronically on the instructions of the artist. The portfolio does not have to be re-created for every art show as it was in the prior art. Due to that, all of the inconvenience associated with prior art portfolio duplication is eliminated. Further, an existing portfolio can be used as the input to a new portfolio which can be modified by adding, deleting, or rearranging items of art to suit a particular show. The artist can then store the new portfolio in the central database. Over time, the artist can create a library of portfolios for use at varying types of art shows. In addition, the portfolio management system also provides flexibility by allowing an artist to access previous applications to evaluate what to submit to a new show.

8. The Application Process.

In addition to the advantage of only having to create a portfolio once, as provided by the portfolio management system, above, the invention also improves the application and registration process. In the preferred embodiment, the portfolio management system is integrated with the artist application system so that when an artist applies to compete in an art show, the artist tells the application system which portfolio to select from the central database. The system obtains the selected portfolio from the central database and makes it available to the show organizers. This greatly reduces the work required on the part of the show organizers and on the part of the artists by eliminating the need for processing and packaging portfolios. The application system also gives the artist the ability to access the portfolio management system to see and rearrange images before the jurors see them. In the preferred embodiment, the artist sees the images as the juror would see them on the preview screen. As a result, artists have better control over what they feel is the best way to present their material. Show organizers also have the ability to see the number of applications to date, and to see what categories of art have entered the art show prior to the application deadline date.

Detailed System Overview

The jurying system allows jurors to review submissions and cast their votes at their own pace. The steps in the process are as follows:

1. Logging in.

The first step for each juror is to log into the system. To be able to distinguish the different jurors, each juror is given a unique user name and a password. This allows both the administrator and the jurors to have an exact overview of their votes. It also insures that only authorized jurors are voting. The function of each juror may vary depending on the nature of the art show in question. Jurors are thus, after successfully logging in, redirected to the jurying module in the system which is relevant to their expertise and function. At this point, the juror is ready to start the jurying process.

2. The Main Menu.

Figure 1:
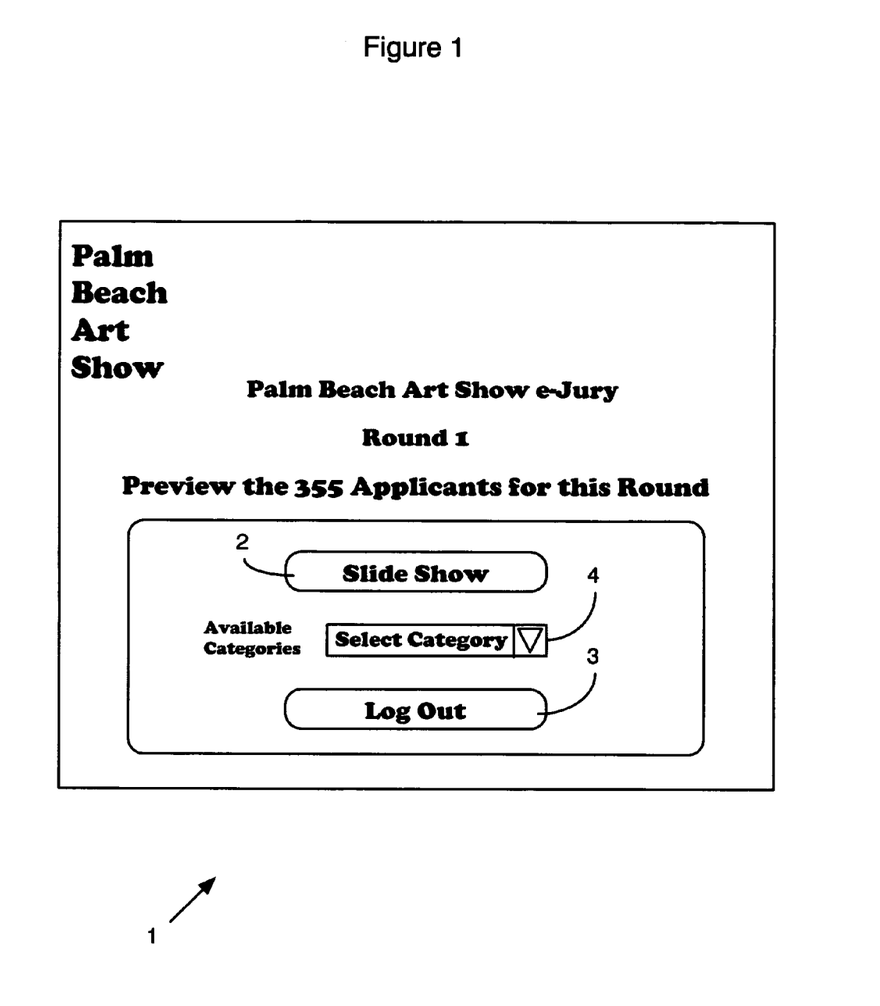

FIG. 1 illustrates the main menu screen 1. After the juror has logged on, the main menu screen 1 is presented which allows the juror to view a slide show of all of the artwork in the show, to select a category of artwork for viewing, or to begin voting. The juror selects a slide show by selecting the Slide Show button 2. When the juror decides to logoff the system, the juror selects the Log Out button 3. To select available categories of artwork to review, the juror selects the Select Categories button 4. When the Select Categories button 4 is selected, a drop-down menu listing the available categories is presented. The juror then selects the desired category and information about the items of artwork in that category is presented.

3. The Slide Show or Image Review Option of the Main Menu

Figure 2:
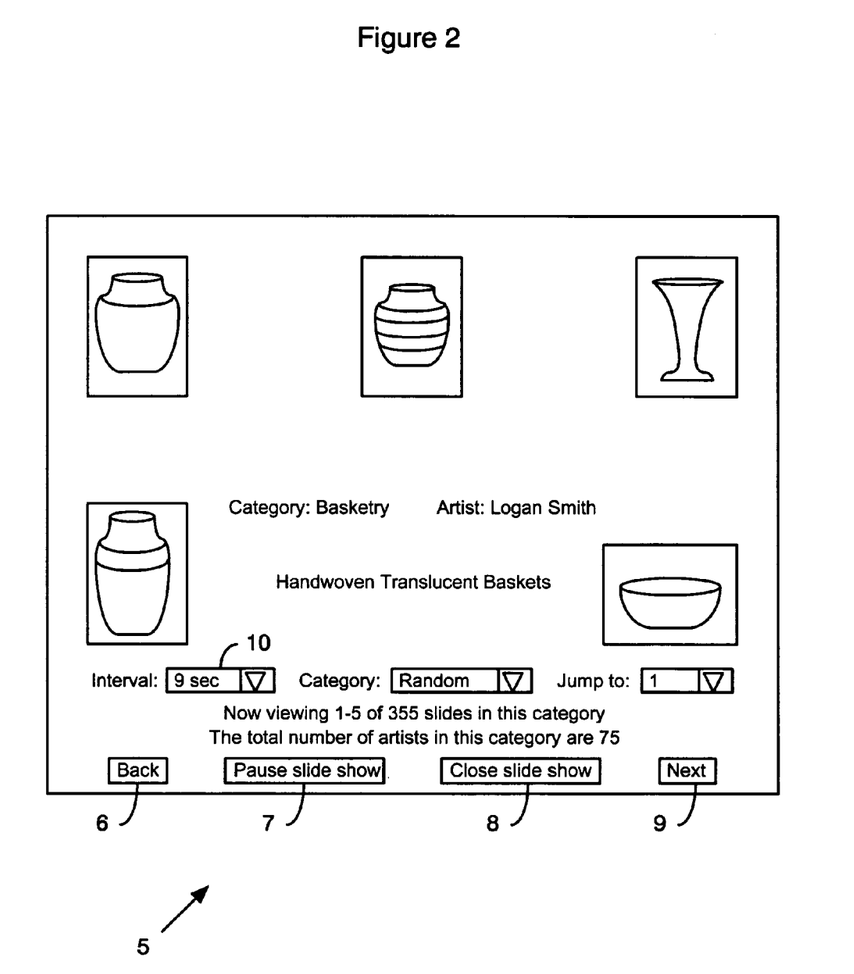
FIG. 2 illustrates a slide show screen showing thumbnail images of multiple works of art on the same page.

In FIG. 2, a slide show screen 5 is illustrated. The slide show screen 5 is reached by selecting the "slide show" button on the main menu screen. The slide show option presents a slide show of all the submitted works of art. It identifies the slides on screen along with the total number of artists. In this case, it displays slides 1-5 of 355, and lists the number of artists as 75. In the preferred embodiment, each page presented to the juror shows the works of a single artist. A short explanation of the materials and techniques is also displayed for the juror. If the juror is interested in a particular piece of art, by selecting the displayed artwork, an enlarged image will be displayed along with more detailed information, including price range of all objects and individual prices, size/dimensions, materials and techniques, about a particular work. In addition, navigation buttons 6-9 are provided at the bottom of the screen to allow the juror to move as desired through the available material. In the preferred embodiment, the interval button 10 can be optionally set to rotate slides at an interval of 3-9 seconds. However, those skilled in the art will recognize that timing is an individual choice and is not critical to the invention. During the voting process, a juror can pause voting with the pause button 7 and request fellow jurors to refer/view. In slide show mode, a juror may wish to discuss a particular artist or may wish to discuss or comment on a particular work of art. By selecting a particular work of art, the system can allow individuals to communicate with other jurors. This particular feature is useful in that this system does not require the jurors to evaluate any of the artists together, yet still allows the jurors to communicate even though they may be remote from one another.

4. The Voting Menu

Figure 3:
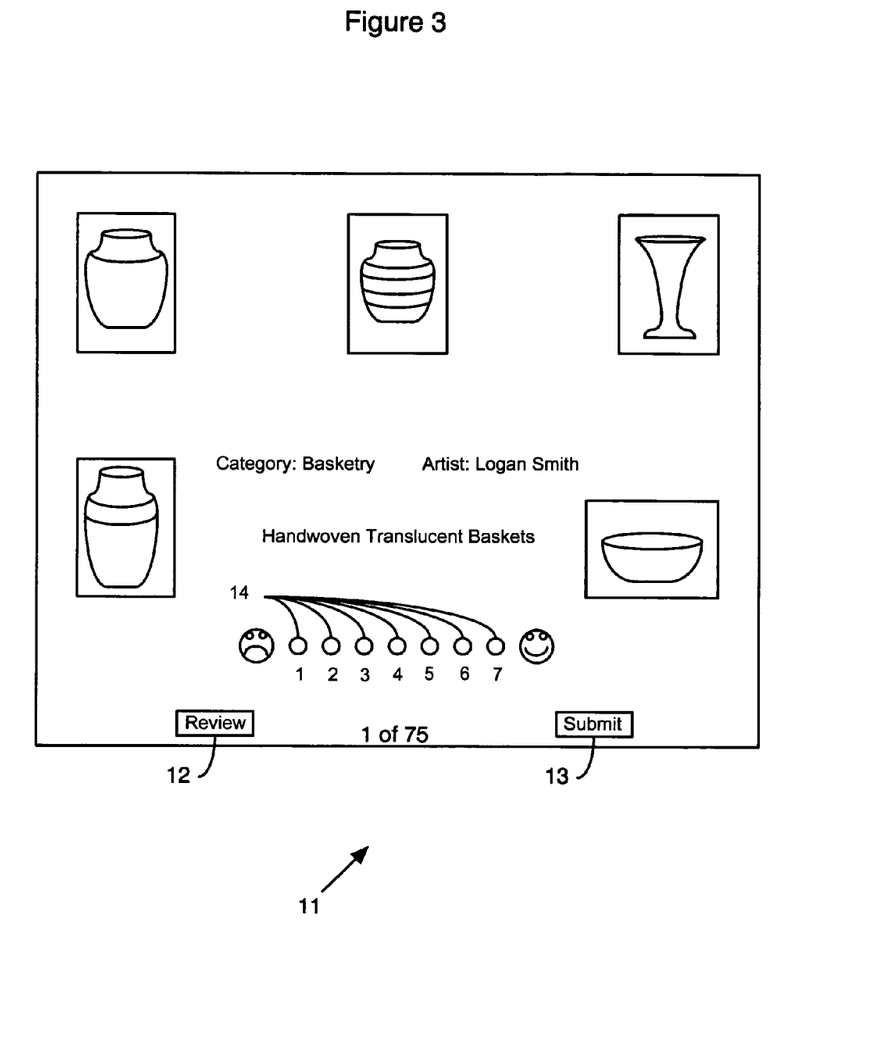
FIG. 3 illustrates a voting menu.

When a juror is ready to vote, a category button 4 is selected on the main menu as illustrated in FIG. 1. This takes the juror to the voting screen 11 as shown in FIG. 3. In the preferred embodiment, each voting screen 11 presented to the juror shows the works of a single artist. A short explanation of the materials and techniques is displayed. If the juror desires more detailed information about a particular work, selecting the work displays a full screen high-resolution image. In addition, more detailed written information is displayed about the image. The juror rates the artists by selecting one of the rating buttons 14. A juror can select the submit button 13 after each vote. Alternatively, the user can select review button 12 to return to the slide show or image review to reevaluate the artists. This is employed after the juror is thoroughly familiar with the system, usually in the first 10-15 minutes of use. If the juror returns to the slide show, or image review the voting is exactly where the juror left to avoid not completing a category. When a category is selected, the number of artists in each category is displayed so the juror knows how many artists they have to vote on in each category. The overall total of artists to be voted on is also displayed.

In the preferred embodiment, the juror is not able to go to the next screen until his vote is cast in the current screen. This ensures that the juror does not inadvertently forget to cast a vote for each item of art. However, this does not mean that the juror cannot change his opinion. If at any time, the juror decides to change his vote, he needs only to select the review button to review his votes. This feature insures that all jurors have completed voting in all categories before a round can be completed and the competition can move to the next round.

5. The Voting Review Menu

Figure 4:
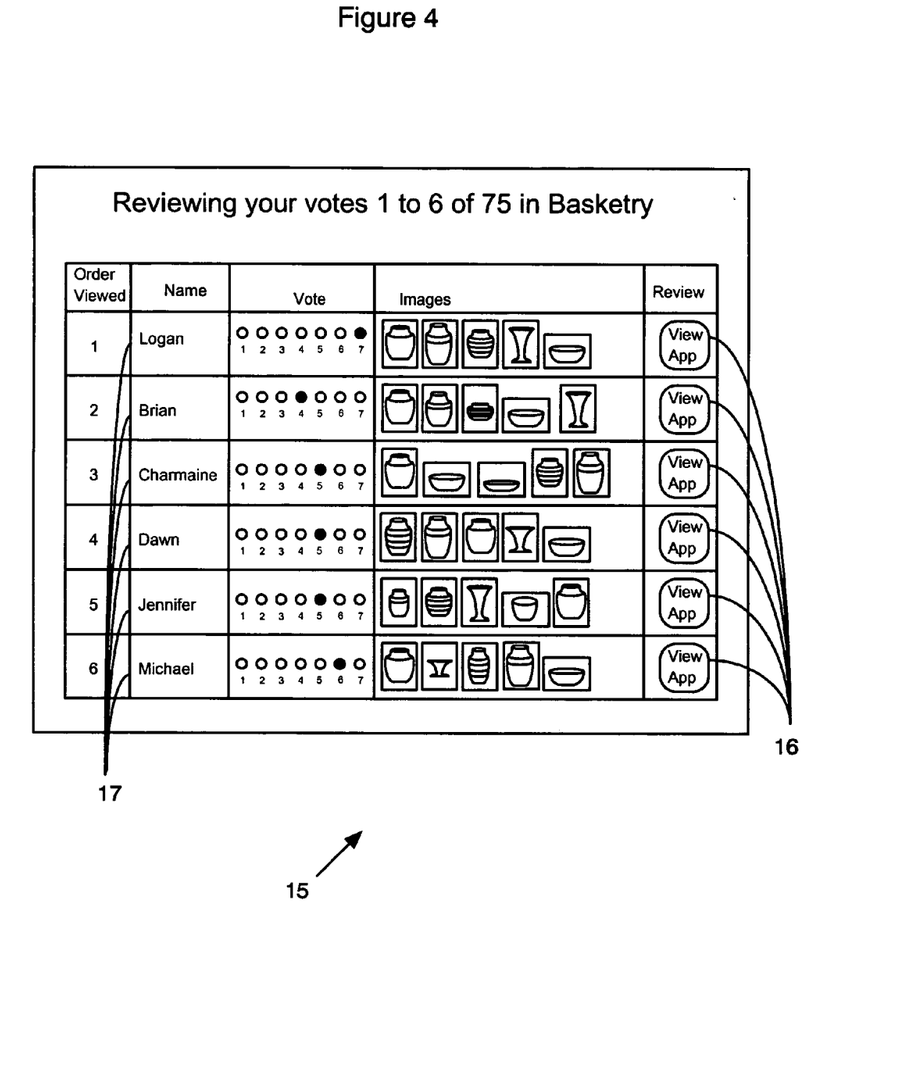
FIG. 4 illustrates an overview menu.

When the review button is selected, the voting overview menu 15, as illustrated in FIG. 4, is presented. The voting overview menu 15 provides the juror with the ability to quickly review several entries on the same screen and to rearrange the entries from highest to lowest score or visa versa. At this time, the juror can change his/her vote by selecting the review buttons 16 and resubmitting the information. In addition, the invention also provides links to more detailed information about the artist and the artist's works. In this screen, if an artist 17 is selected, the system can display a full screen view of the items submitted by that artist. The juror can then examine information with more detail and return to the voting screen when finished using the navigation buttons.

The system also is preferably structured so that votes can only be cast in one category at a time. This ensures that the jurors are comparing like materials during the voting process. However, those skilled in the art will recognize that the voting process can be structured otherwise. For convenience, the main menu in FIG. 1 is designed such that categories in which voting is complete will be shown with a different background color than in categories for which voting has not been completed. Further, if a voting category is complete, selection of that category will automatically take you to the voting review menu.

The system includes an automatic notification system via e-mail for artists to apply or reapply to the juried events. Likewise, e-mail notification is used at registration, application submitted, application paid, unpaid application notification, notifying winners and non-winners, and notifying artist of wait list status.

The administration interface system also includes a reporting function for show organizers to track numerous items, including offline, online and deleted applicant totals for accounting purposes, automated exportable excel databases of winners, declined and waitlist which is automatically emailed to Applicants. These reports include all scores and mailing addresses for applicant notification purposes. In the preferred embodiment, the notification process is fully automated to email all notifications to applicants, however a show may choose to email and/or mail notifications. The preferred embodiment of the system also automatically generates an ftp posting to the server of all the winners images and automatically sends an email notifying the client of the image posting with instructions on how to access the images for all their media print and advertising/publishing needs. Information provided may also include category, juror voting trends, geographical breakdown of artists, etc.

In addition to the foregoing features, the preferred embodiment also includes an optional "Public Voting Module." This feature extends the functionality of the system by allowing members of the general public to vote their preferences in regard to particular artists or works of art. The system can be implemented in several embodiments.

One embodiment uses terminals at the art show that allow individuals to cast votes. To prevent double voting, this implementation may use unique passwords which are given to individuals when they purchase their entrance ticket. The password may be imprinted on the ticket, in which case the voter would have to enter it into the terminal via a keyboard, a mouse, a touch screen, etc. Likewise, it may be encoded into the ticket in the form of a barcode, a magnetic stripe, etc. Whichever method is chosen, it is important that only one vote is allowed for each visitor.

Another embodiment envisions Internet voting. In this embodiment, the same requirement of limiting individuals to a single vote remains. There are a variety ways to do this. One method is to use pre-assigned passwords. Another method is to use e-mail addresses as verification, with only one vote per e-mail address. In this method, the system maintains a list of voters by e-mail address. Each e-mail address is allowed a single vote. This can be done automatically at the system level providing that incoming e-mail addresses can be determined by the system. Preferably, it can be done by preliminarily recording the vote and then sending a confirmation e-mail message to the voter. When the voter responds to the message from that e-mail address, then the vote is accepted. The Public Voting Module provides important advantages to those organizing art shows because they are able to get direct feedback from the public regarding changes in tastes and preferences.

Those skilled in the art will recognize that various changes can be made to the command and data flow used by the invention. However, the primary features of the invention, such as asynchronous voting, remote or local jurying, data collection regarding jurying activity, and centralized management of artists portfolios and integration of the artists application process with a centralized portfolio database are important advantages which set the invention apart from prior art jurying systems. In addition, information provided by the system may include scoring tabulation, accounting and administrative reports.

The system is designed to allow the use of a keyboard or mouse or a combination of the two for the juror's and artist's convenience. In addition, those skilled in the art will recognize that more sophisticated methods of communication, such as voice recognition, can also be used by the system. In the preferred embodiment, conventional computer displays are used to display the menus and images of the artworks. However, those skilled in the art will recognize that any suitable display technology can be used. For example, high definition monitors can be used, projectors or projection devices can be used, etc. In the situation where small groups of jurors are working together, or where jurors have some sight impairment, then large screen or projection devices may be desirable.

While the invention has been described with respect to a preferred embodiment thereof, it will be understood by those skilled in the art that various changes in detail may be made therein without departing from the spirit, scope, and teaching of the invention.

I claim:

1. A jurying system for evaluating works of art, comprising:
    at least one database storing images of artwork of a plurality of artists and information regarding individual pieces of artwork and individual artists;
    a computer system in communication with the database and asynchronously accessible by a plurality of remotely located juror terminals that automatically captures and records data related to juror activity, the data comprising frequency of review, jurors average vote overall, average vote score per category, and how many applications were viewed in each voting round;
    wherein the computer system is accessible by an artist:
        for adding, deleting and rearranging individual pieces of the artist's artwork in at least one portfolio for submission as an entry to a competition, each portfolio comprising a plurality of images of individual pieces of the artist's artwork, and
        for entry of information regarding said individual pieces of the artist's artwork and the artist for creating a portfolio as an entry to a competition;
    wherein the computer system displays the portfolio as a presentation of the selected plurality of images of individual pieces of the artist's artwork and information correlated to the artwork and the artist at a remote terminal for evaluation of the portfolio by a juror;
    wherein the order of display of the individual pieces of the artist's artwork in the portfolio to the juror is determined by the artist online using the computer system.

2. The system according to claim 1, wherein the database includes at least one portfolio database, the portfolio database containing at least one portfolio of artwork for the artist.

3. The system according to claim 2, wherein the computer system receives artist designations of individual images of artwork from all images to create a portfolio, the portfolio selectable by the artist to submit as an entry formatted in a presentation order selected by the artist.

4. The system according to claim 1, wherein the computer system is configured such that the juror may pause their evaluation of the entries and request fellow jurors at remote terminals to review a particular entry and communicate with fellow jurors through the computer system.

5. The system according to claim 1, wherein the computer system is configured to present entries of artist presentations by category of the artwork.

6. The system according to claim 1, wherein the computer system displays the information regarding an individual piece of artwork and an individual artist simultaneously when an image of artwork is displayed.

7. The system according to claim 1, wherein the computer system is configured such that a juror cannot advance to another entry before evaluating a currently displayed entry.

8. The system according to claim 7, wherein the computer system is configured to accept juror evaluations of entries within a single category of artwork before accepting evaluations of entries in a different category.

9. The system according to claim 1, wherein the computer system is configured to accept votes of individual art exhibit attendees, the vote of the individual art exhibit attendees being correlated to a unique identifier provided to the attendee at the time of admission purchase.

10. The system according to claim 1, wherein the computer system determines whether each artist associated with each of the plurality of entries is either a winner or a non-winner of the competition based on finalized evaluations from the jurors.

11. A jurying system for evaluating works of art, comprising:
at least one database storing images of artwork of a plurality of artists and information regarding individual pieces of artwork and individual artists;
a computer system in communication with the database and asynchronously accessible by a plurality of remotely located juror terminals that automatically captures and records data related to juror activity, the data comprising frequency of review, jurors average vote overall, average vote score per category, and how many applications were viewed in each voting round;
wherein the computer system is accessible by an artist for adding, deleting and rearranging individual pieces of the artist's artwork as an entry to a competition, and entry of information regarding said individual pieces of the artist's artwork;
wherein the computer system displays the entry as a presentation of a plurality of pieces of the artist's artwork and information correlated to the artwork and the artist at a remote terminal for evaluation by a juror;
wherein the database includes at least one portfolio database, the portfolio database containing at least one portfolio of the artist's artwork for the artist and the computer system configured to receive artist designations of individual images of the artist's artwork from all images to create a portfolio, the portfolio selectable by the artist to submit as an entry formatted in a presentation selected by the artist;
wherein the order of display of the individual pieces of the artist's artwork in the presentation of an entry to the juror is determined by the artist online using the computer system; and
wherein the computer system displays the information regarding an individual piece of the artist's artwork and an individual artist simultaneously when an image of artwork is displayed; and
wherein the computer system notifies each artist associated with each of the plurality of entries that they are either a winner or a non-winner of the competition.

12. The system according to claim 11, wherein the computer system is configured to present entries of artist presentations by category of the artwork.

13. The system according to claim 12, wherein the computer system is configured such that a juror cannot advance to another entry before evaluating a currently displayed entry.

14. The system according to claim 11, wherein the data related to juror activity further comprises timing of each vote, number of enlarged images each juror reviewed for each vote, how far jurors diverged in their voting, and how many rounds were required to reach the final winner's list.

15. A method of providing a jurying system for evaluating works of art, comprising a computer system, comprising at least one database for storage of images of artwork, for performing the steps of:
receiving at least one image of an artist's artwork of a plurality of artists;
receiving information regarding each image of artwork and each artist;
storing the at least one image of the artist's artwork and the information regarding the artist's artwork and the artist in a database;
receiving artist instructions adding, deleting or rearranging individual pieces of the artist's artwork in a portfolio;
creating an application for submission as an artist's entry to a competition in response to receiving artist selections of individual pieces of the artist's artwork from at least one portfolio and information regarding the artwork and the artist;
receiving artist instructions designating a presentation display order for the individual pieces of the artist's artwork included in the artist's entry;
displaying the artist's entry to a juror located at a remote terminal for evaluation;
displaying a plurality of artist entries on a single screen for evaluation by the juror in the order designated by the artist;
organizing the plurality of entries in a customized sequence for comparison in response to juror input;
receiving a juror evaluation of an artist's entry;
pausing a presentation of an artist's entry in response to juror input;
routing communications regarding the artist's entry between jurors located at different remote terminals; and
automatically capturing and recording data related to juror activity, the data comprising frequency of review, jurors average vote overall, average vote score per category, and how many applications were viewed in each voting round.

16. The method according to claim 15, further comprising the step of presenting entries of artist presentations by category of the artwork.

17. The method according to claim 15, further comprising the step of displaying the information regarding the individual piece of artwork and the artist simultaneously when an image of artwork is displayed to a juror.

18. The method according to claim 15, further comprising the step of preventing a juror from advancing to another entry before evaluating a currently displayed entry.

19. The method according to claim 18, further comprising the step of accept juror evaluations of entries within a single category of artwork before accepting evaluations of entries in a different category.

20. The method according to claim 15, further comprising the step of tabulating votes of individual art exhibit attendees, the vote of the individual art exhibit attendees being correlated to a unique identifier provided to the attendee at the time of admission purchase.

21. The method according to claim 15, further comprising, notifying each of the plurality of artists that submitted entries that they are either a winner or a non-winner of the competition.

22. The system according to claim 15, wherein the data related to juror activity further comprises timing of each vote, number of enlarged images each juror reveiwed for each vote, how far jurors diverged in their voting, and how many rounds were required to reach the final winner's list.

* * * * *